June 30, 1959     E. S. McVEY     2,892,953
COINCIDENCE GATE TRANSISTOR CIRCUIT
Filed June 27, 1957
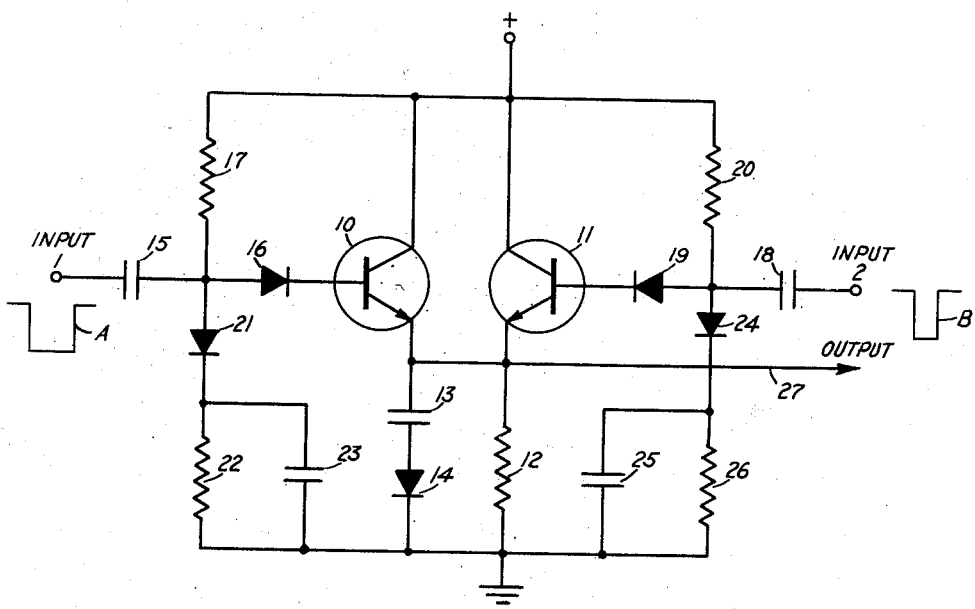
INVENTOR.
EUGENE S. McVEY
BY
ATTORNEYS

United States Patent Office 2,892,953
Patented June 30, 1959

2,892,953

COINCIDENCE GATE TRANSISTOR CIRCUIT

Eugene S. McVey, Fort Wayne, Ind., assignor to the United States of America as represented by the Secretary of the Navy Application June 27, 1957, Serial No. 668,578

5 Claims. (Cl. 307—88.5)

(Granted under Title 35, U.S. Code (1952), sec. 266)

The invention described herein may be manufactured and used by or for the Government of the United States of America for governmental purposes without the payment of any royalties thereon or therefor.

This invention relates to coincidence gating circuits and more particularly to transistor coincidence gating circuits capable of receiving two or more inputs of voltage intelligence having pulse signals to produce output pulse signals each corresponding to the duration of coincidence of the corresponding input pulse signals and to the magnitude of the smaller of the input pulse signals.

While coincidence gating circuits are well known in the prior art using vacuum tubes, which circuits have been successful in many applications, there are many disadvantages of vacuum tube circuits. One disadvantage is that vacuum tube circuits are only as reliable as the vacuum tubes used and the life of vacuum tubes is unpredictable. Secondly, vacuum tube circuits require considerable space and have considerable weight, making them objectionable for use in many applications where such equipment must be carried by vehicles, as aircraft and the like. With the coming of the semi-conductors, or transistors, space and weight of such equipment can be greatly reduced but entirely new circuitry must be devised to obtain the equivalent in functions and results when using these transistors or semi-conductors.

In the present invention two transistors of the N-P-N type are incorporated in circuitry to receive two or more inputs of voltage intelligence having signal pulses to gate output pulses for desired applications. The present invention resulted from considerable research and development to produce a coincidence gating circuit for application in radar ranging devices wherein video signals from the radar ranging equipment and signals from other gating circuits, as from blocking oscillators, could be applied to produce output pulses for operation of tracking or lock-on discriminator circuits, or the like. While the present invention was designed specifically to operate in a particular environment, it is to be understood that this one environment is exemplary only and that such circuits may have numerous applications and be used in many different environments where coincidence gating circuits are needed. In the present invention the two transistors are used in a somewhat symmetrical circuit arrangement and are biased to be normally conducting to produce a constant direct current (D.-C.) voltage output. A separate input is coupled to the base of each transistor, which transistors are protected from high D.-C. components from the signal applying circuits and which inputs are protected from reverse base currents. The transistors are also protected against high positive voltage swings on the input circuits to the bases by coupling direct current restoring networks to these bases. Where high positive voltage swings are not normally encountered from the signal applying sources, the direct current restoration networks may be eliminated. It is therefore a general object of this invention to provide a coincidence gating transistor circuit for producing output pulse signals only during the coincidence of two input pulses for the time that the input pulses are in actual coincidence and of a magnitude equivalent to the magnitude of the smaller input pulse.

These and other objects, advantages, features, and uses may become more apparent as the description proceeds when considered along with the single figure of drawing illustrating one preferred form of the coincidence gating circuit utilizing transistors.

Referring more particularly to the figure of the drawing, two transistors 10 and 11 of the N-P-N type have their collectors directly coupled to a positive voltage source and their emitters coupled in common through a biasing resistor 12 to a lower or grounded voltage of the source. The collector coupling, as shown and described herein, is sometimes referred to as a grounded collector although such a statement is a matter of relativity in that the positive source herein could be the ground potential and the emitters could be coupled to a negative voltage of the source. It is to be understood also that P-N-P type transistors could be used where the polarity of the circuit is reversed. The commonly coupled emitters are connected also to ground potential through a capacitor 13 and a rectifying means or diode 14 coupled in series, the elements 13 and 14 being in parallel with the biasing resistor 12. The rectifying means or diode 14 is oriented for current flow from emitter to ground.

In the present illustration of the preferred form of this invention, input 1, for providing negative voltage pulses, as from a blocking oscillator or other gating circuit, is applied to the base of transistor 10 through a capacitor 15 and through a diode 16 oriented with the low forward resistance in the direction from the input signal to the base. The base of transistor 10 is biased by the biasing resistor 17 coupling the junction of capacitor 15 and diode 16 to the positive voltage source. Input 2, adapted to be coupled to a second source of negative pulses such as the video output of a radar ranging unit or the like, is connected to the base of transistor 11 through a capacitor 18 and a diode 19, in that order, the diode being oriented to permit low resistance flow of current from the signal source to the base. Similarly, the base of transistor 11 is biased through a resistor 20 coupled between the junction of capacitor 18 and diode 19 and the positive voltage source.

The base circuit of each transistor 10 and 11 has a direct current restoring network coupling it to ground. The base of transistor 10 has the junction of the capacitor 15 and diode 16 coupled through a diode 21, which is in series with a parallel R-C network consisting of a resistor 22 and a capacitor 23 to ground. A similar direct current restoring network is coupled in the same manner to the base of transistor 11 by way of the diode 24, capacitor 25, and resistance 26. The output of this coincidence gating circuit is taken from the commonly coupled emitters by way of a conductor 27.

Where the coincidence gating circuit is used to receive consistent pulses on input 1 and pulses having a D.-C. component or positive swings at input 2, the bias on the base of transistor 10 should be a little more positive than the bias on the base of transistor 11. This can be provided for by proper values of biasing resistors 17 and 20. The direct current restoration networks 21, 22, and 23 and 24, 25, and 26 will each reduce the positive voltage swings coming in the inputs 1 and 2, respectively. It has been found that these positive voltage swings may be reduced by as much as a factor of 10:1 and any positive signal getting past the direct current restoring networks may be reduced further or eliminated from reaching the transistors by the network 13, 14 coupled to the emitters of the transistors. The capacitor 13 may be discharged through the back resistance of the diode 14. The capacitive couplings 15 and 18 for the inputs 1 and 2 block the relatively large D.-C. components of the input signals and particularly where these input signals have substantial noise peaks. The diodes 16 and 19 reduce the reverse base currents of transistors 10 and 11, respectively, which reverse currents are objectionable in the operation of the present gating circuit. Where either or both of the input signals will have no noise or positive swings in their voltage signals, the D.-C. restoring networks may be eliminated for either or both of the transistors, as is desirable or feasible.

In the operation of the coincidence gating circuit, as illustrated in the drawing, the transistors 10 and 11 are both normally conducting in the absence of any pulse signals being impressed at either or both inputs 1 and 2 to produce a D.-C. voltage output on the output conductor 27. The transistors 10 and 11 may be biased to conduct near their saturation point although this is not necessary or desirable. Where these transistors are conducting below their saturation point any positive pulse on either transistor base will produce a positive output on the conductor 27. The direct current restoring networks should reduce such positive swings to a minimum. This circuit was designed to utilize and produce negative pulses so, for the purpose of illustration, let it be assumed that negative pulses are applied at input 1 of a waveform similar to that shown by waveform A and that negative pulses are applied at input 2 of a waveform illustrated by waveform B. Let it further be assumed that only the negative pulse A is applied at input 1 which will be applied to the base of transistor 10 to tend to cut off or actually attenuate conduction of this transistor. Such attenuation in the conduction of transistor 10 will cause transistor 11 to increase conduction because of the positive bias in common to the emitters of these transistors. Therefore, the application of only one negative pulse, as A on the base of transistor 10, will produce no change in the output on conductor 27. The same would be true if only the negative voltage pulse B were applied to input 2 since transistor 10 conduction would compensate for the attenuation of conduction of transistor 11. Now, if both negative pulses A and B were applied, respectively, to inputs 1 and 2 at substantially the same instant so that the negative pulse B would either overlap or fall within the time period of negative pulse A, both transistors would be attenuated in conduction for the time which the voltage pulses A and B are in exact coincidence. Although the magnitude of negative pulse B, as illustrated herein, is greater than the magnitude of negative pulse A, as illustrated herein, the magnitude of the negative output pulse on conductor 27 will be that corresponding to the magnitude of the input pulse A. That is, the negative output pulse signal magnitude follows that of the negative input pulse having the smaller magnitude since the conduction between the two transistors 10 and 11 will be compensated and attenuated to correspond with the input signal having the smaller magnitude. This coincidence gating circuit has a power gain because the input impedance of the directly connected collectors is high while the output impedance is low. The voltage gain, however, is near unity.

As may be seen from the above description of operation, the gating circuit may be used to produce a gating output which will be operative to produce negative output pulses only during the coincidence of two negative input pulses. Just by way of illustration, the input 1 may receive gated pulses, as illustrated by A, from a blocking oscillator or other type of gating circuit, to produce attenuation of common conduction only upon the coincidence of corresponding negative pulses at input 2 from a radar detection device producing video signals such as one illustrated by the negative pulse B. When coincidence occurs between the predetermined input signal A and the video input signal B, an output pulse is produced to operate tracking and lock-on discriminators or other equipment where it is desirable to operate from the coincidence of such signals. This is just one application of the gating circuit to illustrate the practicability of the gating circuit although it is to be understood that coincidence of any two negative pulses may be applied for producing output pulses for a particular purpose. It is also to be understood that the circuit may be rearranged or other types of transistors used to accept positive input pulses to produce positive output pulses for certain applications. Also, other transistors may be added to the circuit in a symmetrical manner, as shown and described, to provide coincidence among three or more input signal pulses for certain applications.

While many modifications and changes may be made in the constructional arrangement and details of this invention and temperature-compensating or other compensating circuitry may be included for particular applications, it is to be understood that I desire to be limited only by the scope of the appended claims.

I claim:

1. A coincidence gating circuit comprising: a pair of three-electrode transistors; means applying a potential across the emitter and collector of each transistor, and means applying a biasing voltage to the base of each transistor; a signal input circuit, having a capacitor and a diode in series in that order, coupled to each transistor base for transmitting signal pulses of varying width and amplitude from independent signal sources, said biasing voltage being coupled at the junction of said capacitor and diode and said diode being oriented to prevent reverse base current; a direct current restoration network coupled to at least one of the bases of said pair of transistors for reducing the positive swing of signal pulses; and an output circuit coupled in common to the emitters of said pair of transistors, said base bias voltages and emitter-collector potentials being related to permit an output pulse to be generated only upon the coincident occurrence of two input signal pulses of a pulse width equivalent to the coincidence of the input signals and of an amplitude corresponding to the input signal having the lesser amplitude.

2. A coincidence gating circuit as set forth in claim 1 wherein said restoration network is a second diode in series with a capacitor and resistor in parallel between the transistor base and a fixed potential, said coupling to said base being between said capacitor and first-mentioned diode.

3. A coincidence gating circuit as set forth in claim 2 wherein said transistors are of the N-P-N type and the input networks receive only negative signal pulses.

4. A coincidence gating circuit comprising: first and second three-electrode transistors; means applying a potential across the emitter and collector of each transistor and means for applying a biasing voltage on the base of each transistor, said collectors being coupled in common directly to one terminal of a potential source and said emitters being coupled in common through a resistance and through a serially coupled capacitance and first diode in parallel to said resistance to the other terminal of said potential source; separate signal input circuits, each having a capacitor and a second diode in series, coupled to each transistor base with the base bias being applied at the junction of said capacitor and second diode adapted to apply negative signal pulses from independent signal sources; a direct current restoration network coupled to at least one of the transistor signal input circuits to the base thereof between said capacitor and second diode for reducing the positive swing of signal pulses; and an output circuit coupled in common to the emitters of said transistors, said emitter and collector potentials and said base bias voltages on said bases being so related to permit a negative output pulse to be generated only upon the coincident occurrence of two negative input signal pulses of a pulse width equivalent to the coincidence of the input signals and of an amplitude corresponding to the input signal having the lesser amplitude.

5. A coincident gating circuit as set forth in claim 4 wherein said direct current restoration network consists of a third diode in series with a capacitor and a resistance in parallel between the base and said other terminal of said potential source.

References Cited in the file of this patent

Wolfendale et al.: "The Junction Transistor as a Computing Element," Electronic Engineering, February 1957, pp. 83–87.

Hunter: "Handbook of Semiconductor Electronics," 1956, McGraw-Hill Co., pp. 15–28, 15–44 to 15–45.